United States Patent [19]

Geren et al.

[11] 4,306,301

[45] Dec. 15, 1981

[54] WIDE BAND FREQUENCY SHIFTER IN VARIABLE AMOUNTS

[75] Inventors: Keith E. Geren; Claude C. Routh, both of San Diego, Calif.

[73] Assignee: The United States of America as represented by the Secretary of the Navy, Washington, D.C.

[21] Appl. No.: 384,035

[22] Filed: Jul. 14, 1964

[51] Int. Cl.$^3$ .............................................. H04K 3/00
[52] U.S. Cl. .......................................... 367/1; 434/8
[58] Field of Search ............... 321/62, 61; 340/2, 3 E; 35/10.4; 318/231, 85, 110, 221; 328/55; 325/9; 333/74; 323/121 T; 367/1, 2; 343/18 E; 455/19; 363/157; 434/8

[56] References Cited

U.S. PATENT DOCUMENTS

| | | | |
|---|---|---|---|
| 1,992,625 | 2/1935 | Mathes | 321/61 |
| 2,501,543 | 3/1950 | Short | 321/61 |
| 2,854,764 | 10/1958 | Pierce et al. | 35/10.4 |
| 2,867,738 | 1/1959 | Schwan | 310/160 |
| 2,923,871 | 2/1960 | Cohen | 318/231 |
| 2,934,756 | 4/1960 | Kalmos | 343/12 |
| 2,968,758 | 1/1961 | Ludbrook | 321/68 |
| 2,984,799 | 5/1961 | Gerks | 328/155 X |
| 3,018,478 | 1/1962 | Skillman | 35/10.4 X |
| 3,079,557 | 2/1963 | Grabtree | 325/9 |
| 3,118,140 | 1/1964 | Vladimir et al. | 343/18 X |
| 3,164,659 | 1/1965 | Abrams | 35/10.4 |
| 3,164,787 | 1/1965 | Fontaine | 35/10.4 X |
| 3,176,207 | 3/1965 | Wallace | 318/110 X |
| 3,296,517 | 1/1967 | Routh et al. | 321/60 X |

OTHER PUBLICATIONS

Dome, *Electronics*, Dec. 1946, pp. 112-115.
Kovit, *Space/Aeronautics*, Apr. 1960, p. 129.
Schlesinger, *Principles of Electronic Warfare*, Prentice-Hall, 1961, UG485G4, p. 130.
Albers, *Underwater Acoustics Handbook*, Pa. State Univ., 1960, QC 225 A52, pp. 221-223.

*Primary Examiner*—Richard A. Farley
*Attorney, Agent, or Firm*—R. S. Sciascia; E. F. Johnston; T. L. Styner

EXEMPLARY CLAIM

2. A sonar decoy system for receiving and retransmitting any interrogating signal throughout a wide band of frequencies, said system comprising:

a sonar receiver with a receiving hydrophone;

a sonar transmitter with a radiating transducer;

a resolver with two orthogonal field coils, and a mechanically rotatable rotor coil;

a first and a second network coupled between the output of said receiver and, respectively, said two field coils, said networks each comprising a balanced four-terminal, four-sided bridge with each input terminal coupled, respectively, to the two output terminals through tunable resonant and anti-resonant circuits, said circuits of the networks being differently tuned to shift the phase of the wide band frequencies of one network substantially 90 electrical degrees with respect to the phase shift of the other network for producing a rotating magnetic field in said field coils throughout said wide band;

a reversible variable speed motor coupled to said rotor coil to rotate said rotor coil with, or in opposition to, the direction of rotation of said magnetic field to induce in said fields coils any frequency throughout said wide band of frequencies and increased or decreased depending, respectively, on the direction of rotation of said motor and depending on the speed of said motor, and means for coupling said rotor coil to said transmitter.

2 Claims, 4 Drawing Figures 4,306,301

WIDE BAND FREQUENCY SHIFTER IN VARIABLE AMOUNTS

The invention described herein may be manufactured and used by or for the Government of the United States of America for governmental purposes without the payment of any royalties thereon or therefor.

This invention relates to a system for frequency shifting and is particularly directed to means for simulating the doppler frequency shift in a sonar echo system. More specifically this invention is directed to a decay including a repeater which can slightly modify the frequency of a received signal before reradiation to simulate the doppler frequency shift of a moving target.

The repeater of the type considered here has military sinificance in that it has uses primarily in connection with sea warfare tactics. To confuse enemy sonar it is technically advantageous to set up anchored submerged buoys which will receive any sonar signal regardless of the frequency and which will then shift the frequency up or down a small amount to give to enemy sonar the appearance of either an approaching or a receding target vessel.

The requirements of the repeater considered here are stringent. The repeater must not only accept and repeat sonar frequencies covering a band many octaves wide but must modify the received signal, whatever may be its frequency, and shift the frequency small amounts from 0 cycles to the maximum expected doppler frequency shift, to simulate stationary or advancing or receding target vessels.

An object of this invention is to provide an improved doppler shift repeater.

A more specific object of this invention is to provide a sonar repeater which will receive and repeat signals over a band several octaves in width and will increase or decrease the repeated frequency by amounts varying from 0 to any finite positive frequency. This amount can be varied continuously and is programmable.

The objects of this invention are attained by a repeater comprising a two-phase resolver with right angle stator coils and with a rotatable rotor coil.

Four-terminal lattice bridge-type networks are connected between each stator coil and the signal source, and the resonant and anti-resonant circuits of the networks are so tuned as to produce quadrature magnetic fields. It has been found that the four terminal lattice networks will produce the 90° shift for all frequencies throughout a frequency band of several octaves.

Other objects and features of this invention will become apparent to those skilled in the art after reading the following description of one embodiment shown in the accompanying drawings in which.

Figure 1:
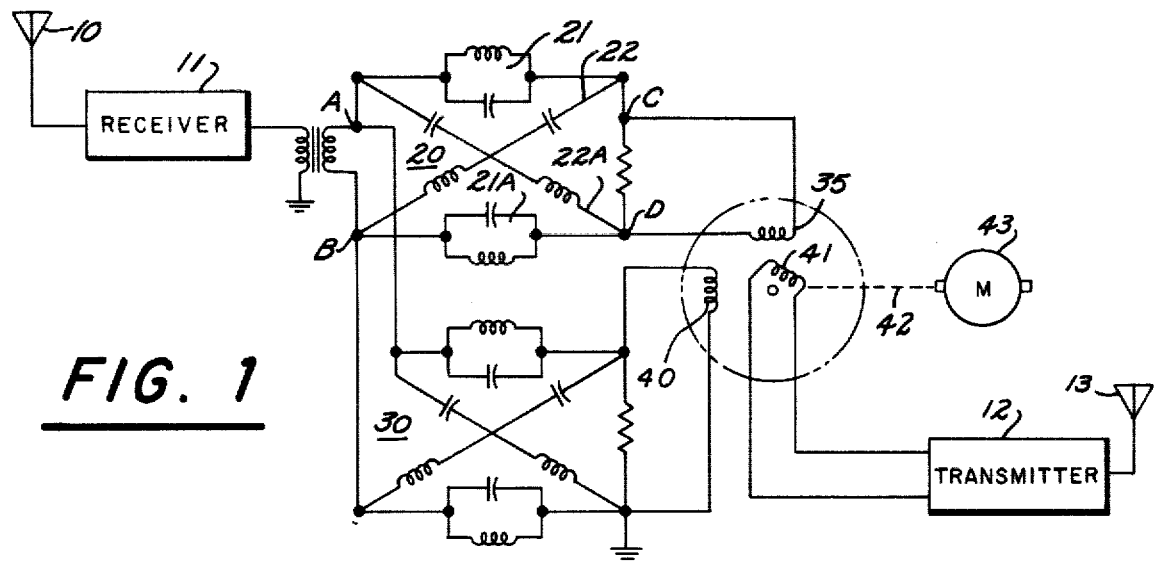
FIG. 1 is a schematic circuit diagram of one repeater of this invention.

The repeater of this invention shown in FIG. 1 comprises the receiving hydrophone 10 connected to the receiver 11 and hence to the transmitter 12 with its radiating transducer 13. The received signal at 10 are reradiated at 13 with 0 or small positive or negative doppler frequency shift. It is contemplated that the band of frequencies which can be faithfully repeated may cover a band many octaves in width.

The doppler shift is added to the repeated signal in the resolver comprising orthogonal stator coils 35 and 40 and rotor coil 41. The received signal is split to produce quadrature voltages in the stator coils 35 and 40 to produce a rotating magnetic field in which the rotor may turn. The rotor is driven in either direction and at variable speeds by the motor 43. If the rotor is stationary the reradiated frequency is identical to the received frequency. If the rotor is revolved counter to the rotating magnetic field the repeated frequency is shifted upward whereas if the rotor rotates in the same direction as the rotating field the doppler shift is downward.

The problem now is to maintain the quadrature fields in coils 35 and 40 at all frequencies expected to be received at the hydrophone 10.

According to an important feature of this invention it has been found the uniform 90° phase shift may be maintained in the stator fields by connecting each stator winding to the signal source through four-terminal lattice networks. The networks are of the four sided type wherein each input terminal is connected to the two output terminals, respectively, through similarly tuned resonant and anti-resonant circuits. For example, network 20 comprises input terminals A and B and output terminals C and D. Input terminal A is connected to output terminals C and D, respectively, through the anti-resonant circuit 21, comprising parallel tuned inductance and capacity, and series resonant circuit 22A. Likewise input terminal B is connected to output terminals D and C through anti-resonant circuit 21A and series resonant circuit 22.

Network 30, between stator coil 40 and the signal source, is likewise made up of a four-terminal four-sided bridge. Here, however, the resonant and anti-resonant frequency of the tuned circuits differ from the resonant frequency of network 20.

Figure 2:
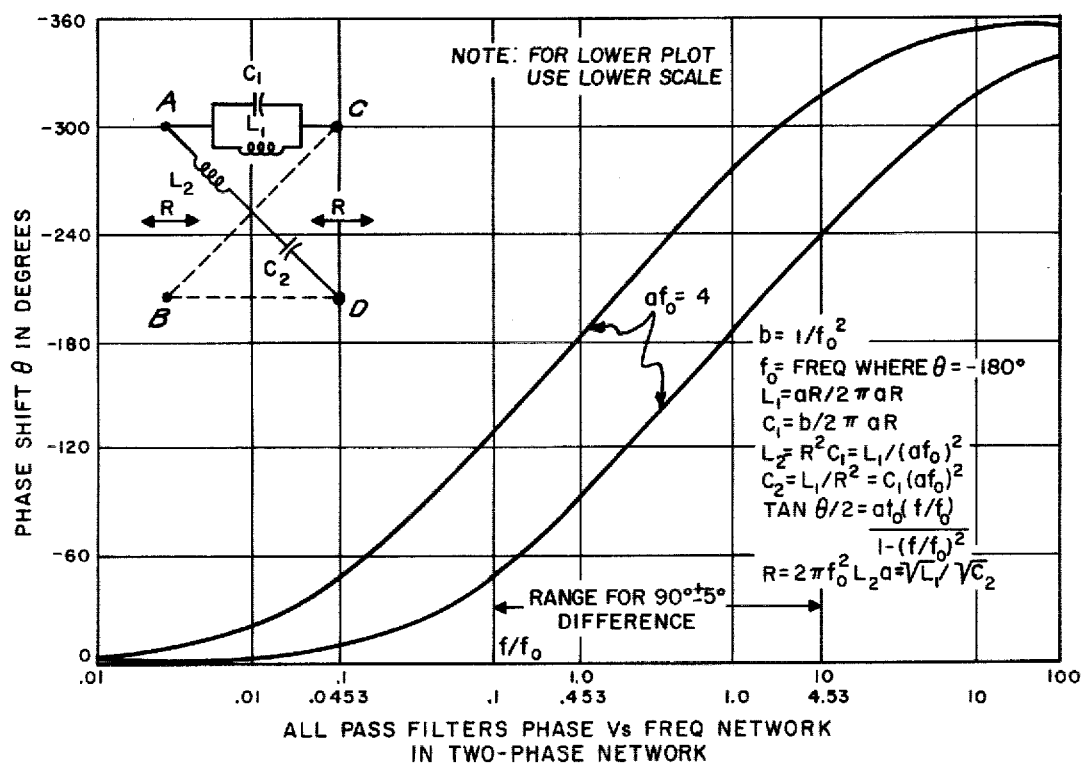
FIG. 2 is a frequency-phase diagram of a lattice network employed in FIG. 1.

FIG. 2 shows the phase-frequency characteristics of two lattice networks, the resonant circuits of which are tuned to different frequencies. It was found that if the design parameter, afo, of the two networks was 4, the phase of the currents in the outputs of the two networks differed by 90°; and surprisingly, the 90° difference maintained for all applied frequencies from $0.44f_o$ to $10.f_o$.

Figure 3:
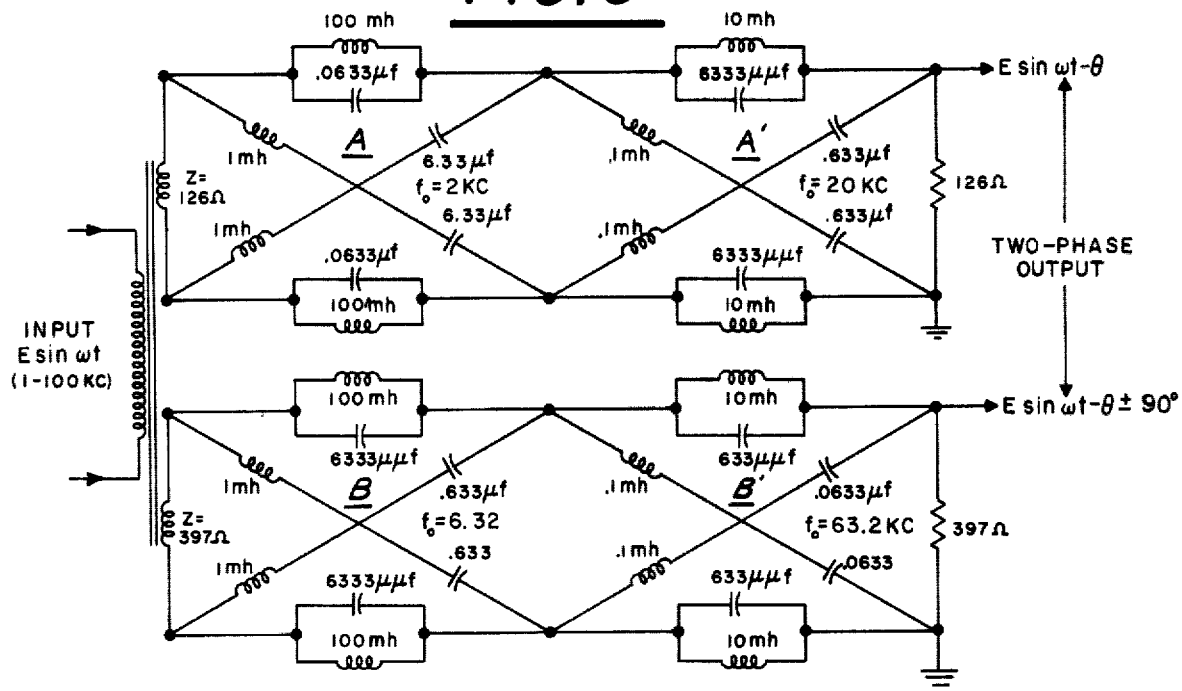
FIG. 3 is a circuit schematic diagram of double networks which can be employed in the system of FIG. 1.
Figure 4:
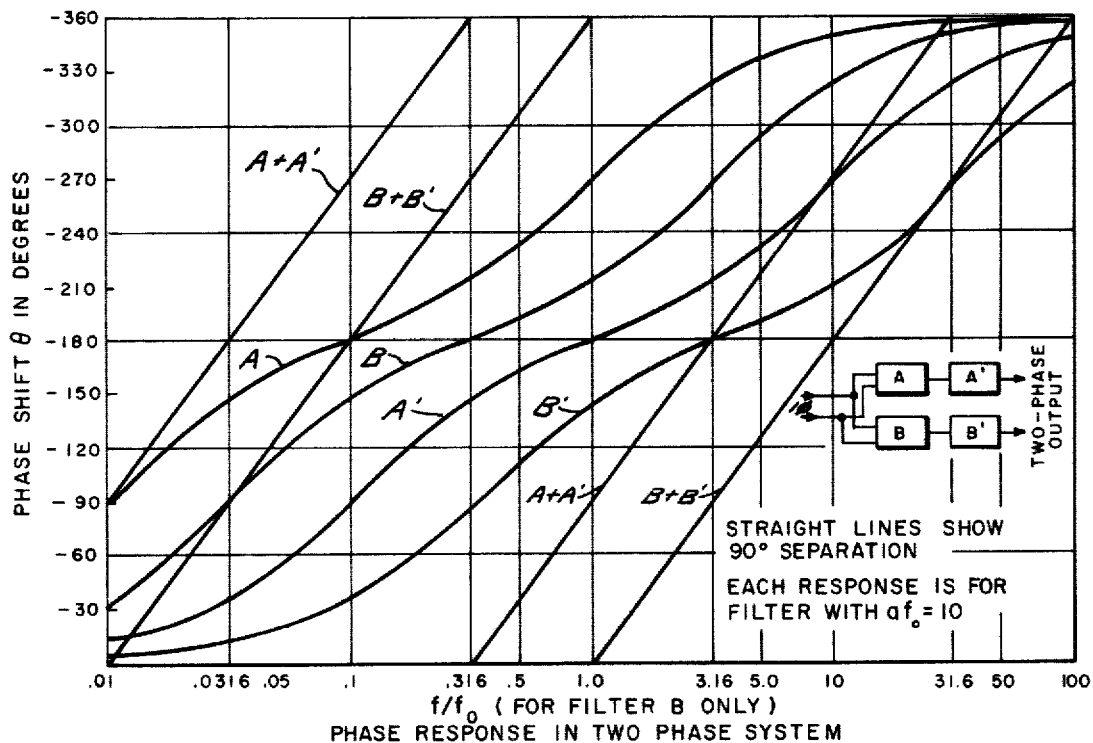
FIG. 4 is a frequency-phase diagram of the networks of FIG. 3.

The range of frequencies over which the uniform 90° phase shift maintains may be extended by connecting two lattice networks in cascade between the signal source and the stator coils 35 and 40. The cascaded networks with specific examples of inductive and capacitive values are shown in FIG. 3. In this case the phase shift produced by a network A is added to the phase shift of network A' and likewise the phase shifts of networks B and B' are added, as shown in FIG. 4. The range of the frequencies of the system of FIG. 3 in which the 90° phase split is maintained is illustrated by the extended parallel lines, A+A' and B+B'. It is noted that the frequency range of quadrature currents extends from about $0.05f_o$ to about $5f_o$, which is 6.5 octaves.

Many modifications may be made in the specific details of the system of this invention without departing from the scope of the appended claims.

What is claimed is:

1. A system for adding a doppler frequency shift to any frequency within a wide band of frequencies, the system comprising;

a machine having two right-angle stator windings and a rotor winding rotatable in the stator field;

a broad-band signal source;

a first and a second four-terminal lattice network, each input terminal of each network being connected to the two associated output terminals, respectively, through similarly tuned resonant and anti-resonant circuits, the tuned circuits of the first and second networks being differently tuned to differently shift the phases of applied signals;

means for coupling said networks, respectively, between said source and said two stator windings to produce a two-phase rotating magnetic field around said rotor, and means for selectively driving said rotor at variable speeds in, or counter to, the direction of rotation of said field; to add said doppler frequency shift to the frequency induced by the stator in said rotor.

2. A sonar decoy system for receiving and retransmitting any interrogating signal throughout a wide band of frequencies, said system comprising;

a sonar receiver with a receiving hydrophone;

a sonar transmitter with a radiating transducer;

a resolver with two orthogonal field coils, and a mechanically rotatable rotor coil;

a first and a second network coupled between the output of said receiver and, respectively, said two field coils, said networks each comprising a balanced four-terminal, four-sided bridge with each input terminal coupled, respectively, to the two output terminals through tunable resonant and anti-resonant circuits, said circuits of the networks being differently tuned to shift the phase of the wide band frequencies of one network substantially 90 electrical degrees with respect to the phase shift of the other network for producing a rotating magnetic field in said field coils throughout said wide band;

a reversible variable speed motor coupled to said rotor coil to rotate said rotor coil with, or in opposition to, the direction of rotation of said magnetic field to induce in said fields coils any frequency throughout said wide band of frequencies and increased or decreased depending, respectively, on the direction of rotation of said motor and depending on the speed of said motor, and means for coupling said rotor coil to said transmitter.

* * * * *